R. WHITAKER, Jr.
HORSESHOE CALK.
APPLICATION FILED AUG. 27, 1918.
1,301,345.
Patented Apr. 22, 1919.
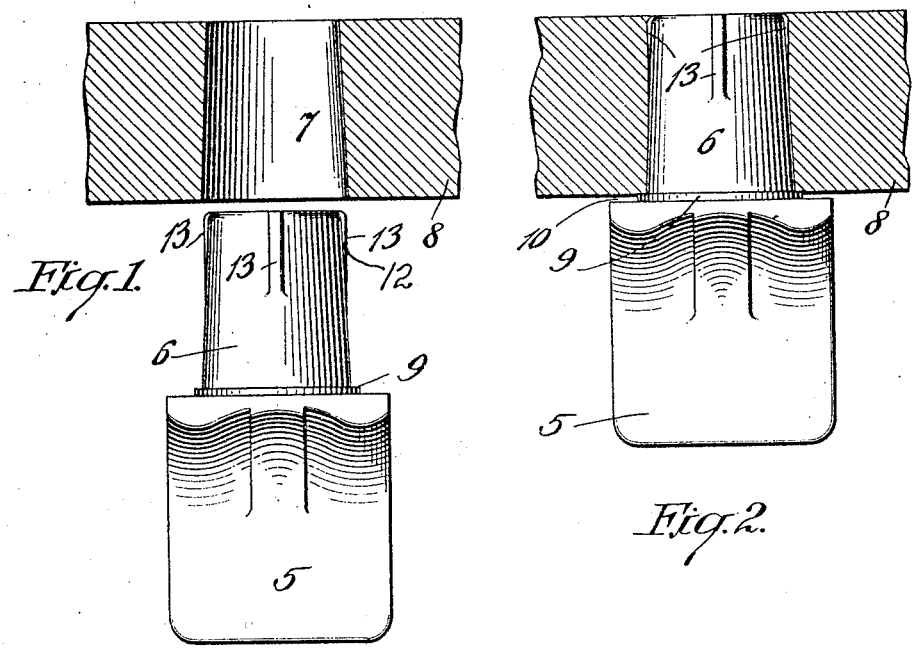
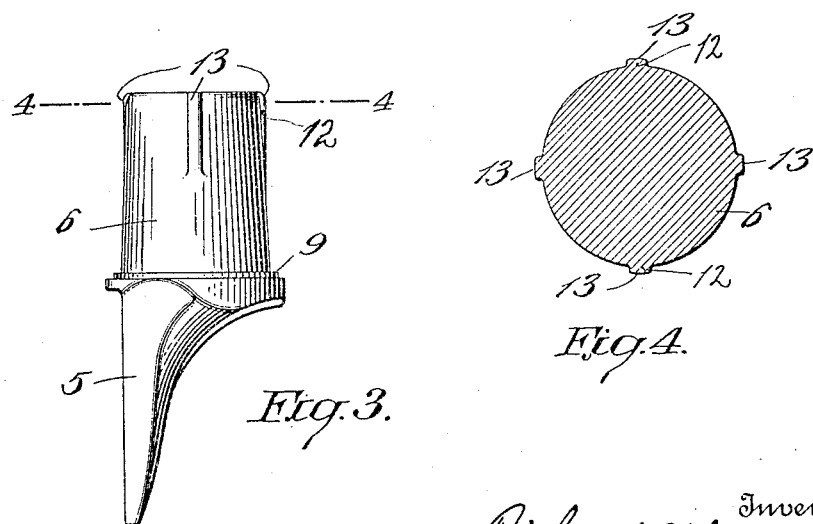
Inventor
Richard Whitaker Jr
By his Attorney
Archibald Cox

UNITED STATES PATENT OFFICE.

RICHARD WHITAKER, JR., OF NEW BRUNSWICK, NEW JERSEY, ASSIGNOR TO MANUFACTURERS IRON & STEEL COMPANY, OF NEW BRUNSWICK, NEW JERSEY, A CORPORATION OF NEW JERSEY.

HORSESHOE-CALK.

1,301,345.  Specification of Letters Patent.  Patented Apr. 22, 1919.

Application filed August 27, 1918. Serial No. 251,613.

*To all whom it may concern:*

Be it known that I, RICHARD WHITAKER, Jr., a citizen of the United States, residing at New Brunswick, in the county of Middlesex and State of New Jersey, have invented a new and useful Improvement in Horseshoe-Calks, of which the following is a specification.

The present invention relates to an improvement in horseshoe calks, and more particularly to an improvement in horseshoe calks provided with tapered shanks adapting the calks to be driven into correspondingly shaped holes in the horseshoe.

Horseshoe calks of the above type, known technically as "drive" calks, have gone into extensive use by reason of the fact that they may be quickly and readily attached to the horseshoe and as readily removed from the shoe when worn out to be replaced by fresh calks. A somewhat serious drawback to the successful use of drive calks as at present constructed lies in their liability to drop out of the shoe and so be lost, when they become loosened in the shoe from the strains and jars to which they are subjected while in use. The object of the present invention is to produce a horseshoe calk of the drive type, of such construction that the liability of the calk becoming loose in and dropping from the horseshoe is reduced to a minimum, if not entirely eliminated. To the accomplishment of this object, the invention consists in the improved horseshoe calk described in the following specification and particularly pointed out in the appended claims.

The preferred form of the invention is illustrated in the accompanying drawings, in which Figure 1 is a front elevation of the improved calk in position to be driven into its tapered hole in the horseshoe; Fig. 2 is a view similar to Fig. 1 with the calk in place in the horseshoe; Fig. 3 is a side elevation of the calk; and Fig. 4 is a section taken on the line 4—4 of Fig. 3.

The improved horseshoe calk as illustrated in the drawings comprises a head portion 5 and a shank portion 6. The shank 6 is tapered and is of such size that when it is driven into the correspondingly tapered hole 7 in the horseshoe 8, it will fit tightly therein. At the junction of the head 5 and the shank 6 there is a shoulder 9 for the purpose of providing a narrow opening 10 between the head 5 and the shoe 8 when the calk is driven into its hole as shown in Fig. 2. This space permits a tool to be inserted between the calk head and the shoe, so that the calk may be readily removed from the shoe and a fresh calk substituted for it. It will be recognized that if the tapered shank of the calk becomes loosened in the tapered hole in the horseshoe under the strain and jars to which the calk is subjected while in use, and that if the calk begins to work its way out of the shoe even slightly, that there is no friction between the parts, owing to the taper, to prevent the calk from dropping out of the shoe. Having once become loosened in the shoe, the chances are that the calk will drop out of the shoe. To prevent the horse from losing the calk, that is to say, to prevent the calk from dropping out of the shoe if it should become loosened therein, the shank of the calk is, by the present invention, provided with a plurality of ribs 12 located on the periphery of the smaller end of the shank. Preferably, the ribs are arranged so as to be oppositely disposed, and in the drawings there are shown two of these pairs of diametrically opposed ribs on the shank. The ribs begin at substantially the middle of the length of the shank and extend to the extremity of the smaller end thereof. The outer edges or surfaces 13 of the ribs lie parallel with the axis of the shank. The diameter of the shank through the ribs is, therefore, the same throughout the length of the ribs. By reason of this construction of the ribs, they have a tapered relation with respect to the surface of the shank, that is, to the taper of the shank. The ribs are substantially square in cross-section, as shown in Fig. 4, the corners being as sharp as mechanical conditions will permit. This construction prevents any turning or twisting of the calk in the shoe when the calk strikes a stone or other obstruction while in use.

When the improved calk as described above is driven into a hole of the proper shape and size in the horseshoe, the ribs cut or form grooves in the tapered hole. These grooves extend longitudinally of the hole and their bottoms are parallel with the axis of the hole. In other words, the distance between the bottoms of the opposite grooves is the same from top to bottom, this distance being substantially the diameter of each pair of ribs on the shank of the calk. The result of this construction and arrangement of parts is that even should the tapered shank of the calk become loosened in the horseshoe, yet because the straight ribs on the shank are in tight frictional engagement with the straight grooves in the hole, the friction of the ribs against the sides and bottoms of the grooves will prevent the calk from dropping out of the shoe. Even if the calk does work out a slight distance, the engagement of the ribs with the grooves will prevent a complete falling out before the calk is struck and driven back again as the horse puts his hoof down. It is thus seen that by reason of the improved calk of the present invention the liability of the calk becoming loose and dropping from the horseshoe into which it is driven is reduced to practically a minimum. And experiment has demonstrated that the percentage of horseshoe calks of the drive type constructed according to the principle of the present invention, loosening and dropping from the shoe, is practically negligible.

Having thus described the invention, what is claimed is:—

1. A horseshoe calk comprising a head and a tapered shank, the shank being provided at its smaller end with pairs of oppositely disposed ribs, the diametric distance between each pair of ribs being the same throughout the length of the ribs.

2. A horseshoe calk comprising a head and a tapered shank, the shank being provided with a plurality of ribs at its smaller end, the outside edges of the ribs being parallel to the axis of the shank.

3. A horseshoe calk comprising a head and a tapered shank, the shank being provided with a plurality of ribs the outside edges of which lie parallel to the axis of the shank.

4. A horseshoe calk comprising a head and a tapered shank, the shank being provided with pairs of diametrically opposed ribs extending from substantially half way the length of the shank to the smaller end thereof and being tapered with relation to the surface of the shank.

5. A horseshoe calk comprising a head and a tapered shank, the shank being provided with a plurality of ribs the outside edges of which are tapered with respect to the taper of the shank.

RICHARD WHITAKER, Jr.

Copies of this patent may be obtained for five cents each, by addressing the "Commissioner of Patents, Washington, D. C."